US006971501B2

(12) United States Patent  (10) Patent No.: US 6,971,501 B2
Beyer  (45) Date of Patent: Dec. 6, 2005

(54) SCREW CONVEYOR FOR THE TRANSPORT OF GOODS HANGING FROM HANGER SUPPORTS

(75) Inventor: Rolf Beyer, Türkheim (DE)

(73) Assignee: WF Logistik GmbH, Landsberg (DE)

( * ) Notice: Subject to any disclaimer, the term of this patent is extended or adjusted under 35 U.S.C. 154(b) by 0 days.

(21) Appl. No.: 10/492,328

(22) PCT Filed: Oct. 24, 2002

(86) PCT No.: PCT/EP02/11912

§ 371 (c)(1),
(2), (4) Date: Sep. 3, 2004

(87) PCT Pub. No.: WO03/037758

PCT Pub. Date: May 8, 2003

(65) Prior Publication Data
US 2005/0006202 A1 Jan. 13, 2005

(30) Foreign Application Priority Data
Oct. 26, 2001 (DE) ................ 101 52 926

(51) Int. Cl.[7] ............................................. B65G 47/26
(52) U.S. Cl. ............................. 198/459.3; 198/465.4; 198/676
(58) Field of Search .......................... 198/459.3, 465.4, 198/678.1, 662, 676, 677, 670

(56) References Cited

U.S. PATENT DOCUMENTS 4,995,531 A * 2/1991 Summers ................. 198/467.1
5,269,402 A * 12/1993 Speckhart et al. .......... 198/670
5,305,896 A * 4/1994 Branch .................... 198/459.3
5,788,054 A * 8/1998 Janzen et al. ............. 198/459.3

FOREIGN PATENT DOCUMENTS

JP 62-249825 * 10/1987 .............. 198/465.3

* cited by examiner

Primary Examiner—James R. Bidwell
(74) Attorney, Agent, or Firm—Scott D. Wofsy; Edwards & Angell, LLP

(57) ABSTRACT

A screw conveyor for the transport of, for example, pieces of clothing hanging on clothes hangers, comprises a screw shaft train (22) which may be rotated about the shaft axis (24) thereof, with a transport groove system (26), machined into the outer surface thereof along the shaft axis (24) in the form of a screw. The clothes hangers may be hung in the transport groove system (26), using the hanger hooks (20) thereof and axially transported by rotation of the screw shaft train (22). According to the invention, the transport groove system (26) comprises at least one primary transport groove (46, 48), from which a secondary transport groove (52, 54), preceding the primary transport groove (46, 48) in relation to the transport direction (16) of the goods for transport, branches at a branching position (62). The embodiment of the primary transport groove (46, 48) and the secondary transport groove (52, 54) is set, particularly with regard to the slope profile thereof, such that clothes hangers (12a) free of crossovers, which approach the branching position (62) in the primary transport groove (46, 48), pass the branching point (62) without leaving the primary transport groove (46, 48). A sensor arrangement (68) is provided on the screw shaft train (22) for recognition of clothes hangers (12b, 12c) with a cross-over, which is also embodied to monitor the secondary transport groove (52, 54) for clothes hangers (12c) transported therein.

7 Claims, 5 Drawing Sheets

SCREW CONVEYOR FOR THE TRANSPORT OF GOODS HANGING FROM HANGER SUPPORTS

Figure 1:
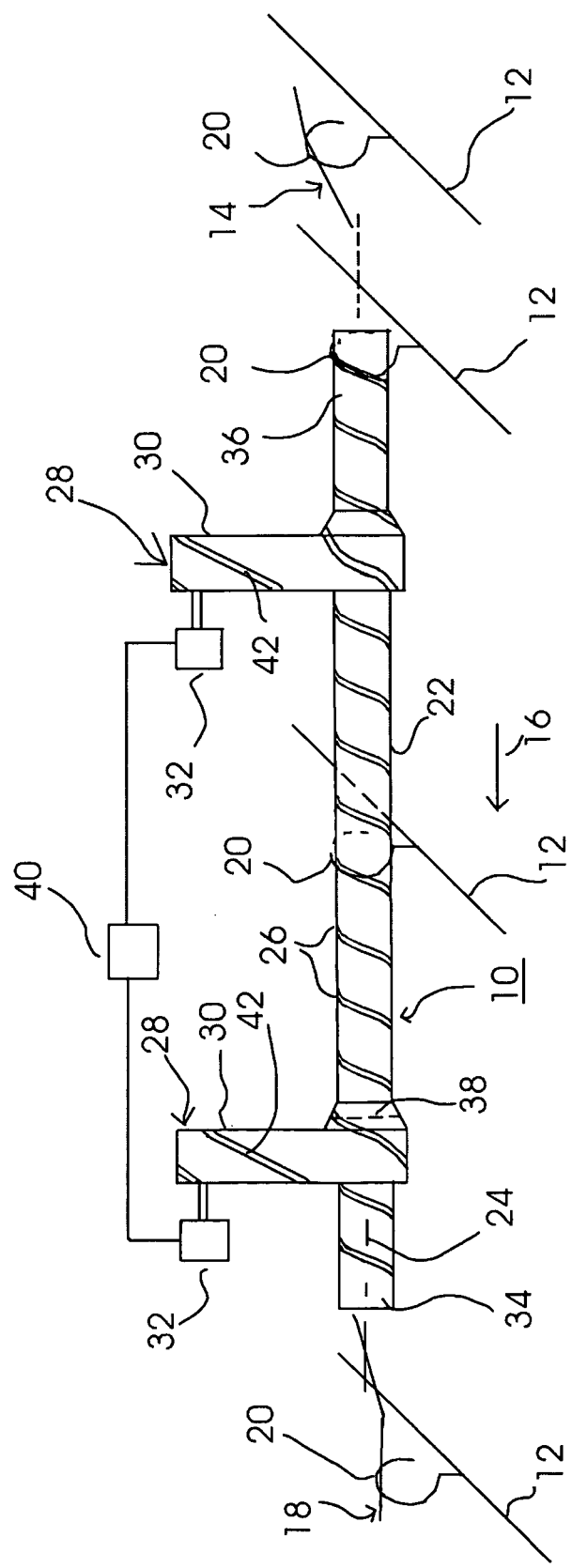

The invention relates to a screw conveyor for transporting conveyable articles hanging on hanging carriers.

Screw carriers are used, for example, for transporting items of clothing hung on clothes hangers, for example within the context of a suspension-type conveying installation for sorting and order-picking items of clothing. In the screw conveyor, the clothes hangers are suspended, by way of their upper hanger hooks, in the helix or helices of a screw shaft, the helix or helices being formed by a system of conveying grooves. If the screw shaft is driven in rotation about its shaft axis, then the clothes hangers guided in the conveying-groove system are advanced in the direction of the shaft axis.

It is often the case that, rather than being supplied to the screw conveyor completely separately from one another, the clothes hangers are supplied in more or less disordered batches of bunched-up clothes hangers. This often results in two (or more) clothes hangers crossing over, i.e. in one clothes hanger which is suspended, by way of its hanger hook, in the conveying-groove system of the screw shaft upstream of another clothes hanger—as seen in the conveying direction of the items of clothing—passing, by way of its hanger crosspiece, behind the hanger crosspiece of this other, subsequent clothes hanger, with the result that the two clothes hangers cross over at their hanger necks.

In order for it to be possible for the clothes hangers to be discharged individually from the screw conveyor, for example onto individual hanger carriers, crossed-over clothes hangers have to be disentangled beforehand. Configurations of the conveying-groove system of the screw shaft which make it possible for such crossed-over clothes hangers to be disentangled from the outside, without manual or mechanical intervention, as they pass through the screw conveyor are known. In this case, the crossed-over clothes hangers are guided up to one another in the conveying-groove system by way of their hanger hooks until, finally, one of the clothes hangers is disengaged from the other and is lifted beyond the same, and the crossover is eliminated in this way. In practical usage, however, it has been found that it is not always possible for all crossovers of clothes hangers to be reliably eliminated in this way. In order, nevertheless to ensure that the clothes hangers can leave the screw conveyor individually and without any crossovers, it would then be necessary to give a member of operating staff the task of constantly observing the procedures in the screw conveyor and intervening if he/she detects any remaining crossovers of clothes hangers. Of course, this uses up operating staff and stands in the way of the general wish for the conveying processes to be, as far as possible, automated.

The object of the invention is thus to configure a screw conveyor such that it allows automated detection of crossed-over clothes hangers, or other hanging carriers used for transporting conveyable articles.

In order to achieve this object, the invention takes as its departure point a screw conveyor for transporting conveyable articles hanging on hanging carriers, in particular items of clothing hung on clothes hangers, comprising a screw-shaft line which can be rotated about its shaft axis and has a conveying-groove system which is made in the outer surface of the screw-shaft line, winds helically along and around the shaft axis, and in which the hanging carriers can be suspended, by way of carrying hooks, and can be conveyed axially by rotation of the screw-shaft line.

It is proposed according to the invention, for such a screw conveyor, that the conveying-groove system has at least one primary conveying groove, from which a secondary conveying groove, which precedes the primary conveying groove—as seen in the conveying direction of the conveyable articles along the shaft axis—branches off at a branching-off location, the configurations of the primary conveying groove and of the secondary conveying groove being coordinated, in particular in respect of the pitch profile thereof, such that crossover-free hanging carriers which approach the branching-off location in the primary conveying groove pass the branching-off location without leaving the primary conveying groove, and that, in order to detect crossed-over hanging carriers, the screw-shaft line is assigned a sensor arrangement which is designed for monitoring at least the secondary conveying groove for hanging carriers conveyed therein.

The invention makes use of the fact that, in the case of crossed-over hanging carriers, which are guided—if appropriate once they have passed through an upstream separating section—in different turns of the conveying-groove system of the screw-shaft line, the carrying hooks of these hanging carriers are subjected to tensile forces which try to draw the carrying hooks toward one another. This effect, which is equivalent to the tendency of the hanging carriers to compensate for their crossover-induced oblique position, is caused merely by the weight of the hanging carriers, but is significantly enhanced by the weight of the articles hanging on the hanging carriers. In the case of two crossed-over hanging carriers, the carrying hook of the leading hanging carrier, as seen in the conveying direction, is thus subjected to an axially rearwardly directed tensile force, while the carrying hook of the trailing hanging carrier is subjected to an axially forwardly directed tensile force. As a result, the leading hanging carrier (like all the rest of the hanging carriers which are free of crossovers) does not leave the primary conveying groove at the branching-off location, but the trailing hanging carrier, on account of the tensile force driving it axially forward, enters into the secondary conveying groove at the location at which the latter branches off from the primary conveying groove. Consequently, the action of a hanging carrier running into the secondary conveying groove is a reliable indication of the presence of crossed-over hanging carriers. In the case of the solution according to the invention, the sensor arrangement allows such an event to be detected automatically, and thus without any need for operating staff.

The sensor arrangement may comprise a first sensor, for monitoring the secondary conveying groove, and a second sensor, which is arranged ahead of the first sensor, as seen in the conveying direction, and is intended for monitoring the primary conveying groove for hanging carriers conveyed therein, an evaluation unit, which is connected to both sensors, emitting a crossover-detection signal when the two sensors detect a hanging carrier in the respective conveying groove in a predetermined time-specific relationship with respect to one another, in particular simultaneously.

The secondary conveying groove expediently opens out into the primary conveying groove again at a distance from the branching-off location. In practical usage, it has proven advantageous if the secondary conveying groove extends approximately over a complete turn between its location at which it branches off from the primary conveying groove and its location at which it opens out into the primary conveying groove.

In order to increase the capacity of the screw conveyor, the conveying-groove system may have a plurality of at least two primary conveying grooves which wind around the shaft axis one beside the other. A secondary conveying groove will preferably then branch off from each of these primary conveying grooves, the sensor arrangement being designed for monitoring each of the secondary conveying grooves for hanging carriers conveyed therein. It is possible here, upstream of the branching-off locations of the secondary conveying grooves, for example in a separating section, for one of the primary conveying grooves to start between two successive turns of another primary conveying groove. This makes it possible to protect the screw conveyor against overloading wherever the relevant primary conveying groove starts.

For reasons of cost and on account of the straightforward operation, it is recommended to use an inductive sensor arrangement for metallic hanging carriers. Of course, this does not preclude the use of sensor arrangements which operate in accordance with other principles, for example an optical sensor arrangement.

Figure 2:
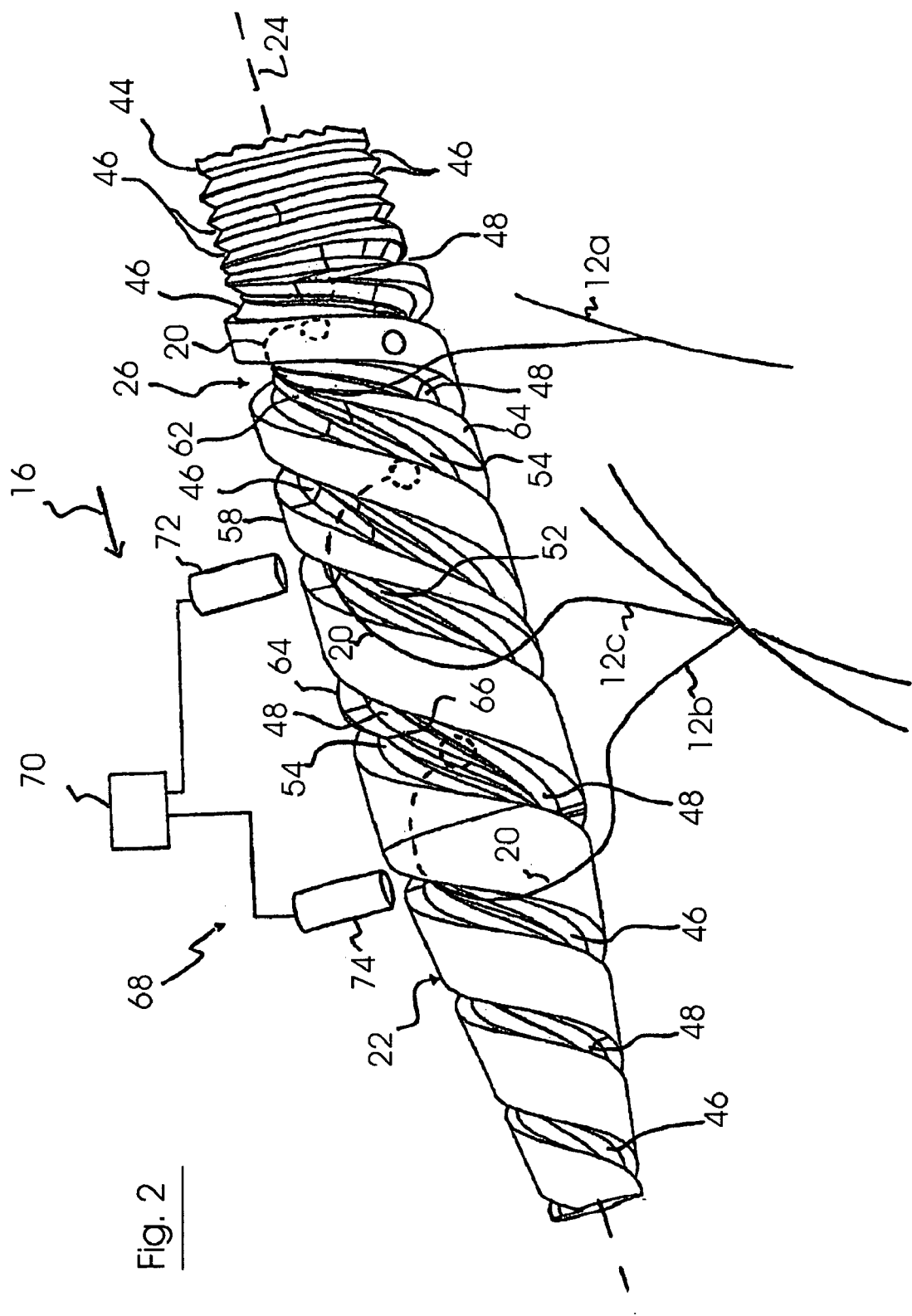
Figure 3:
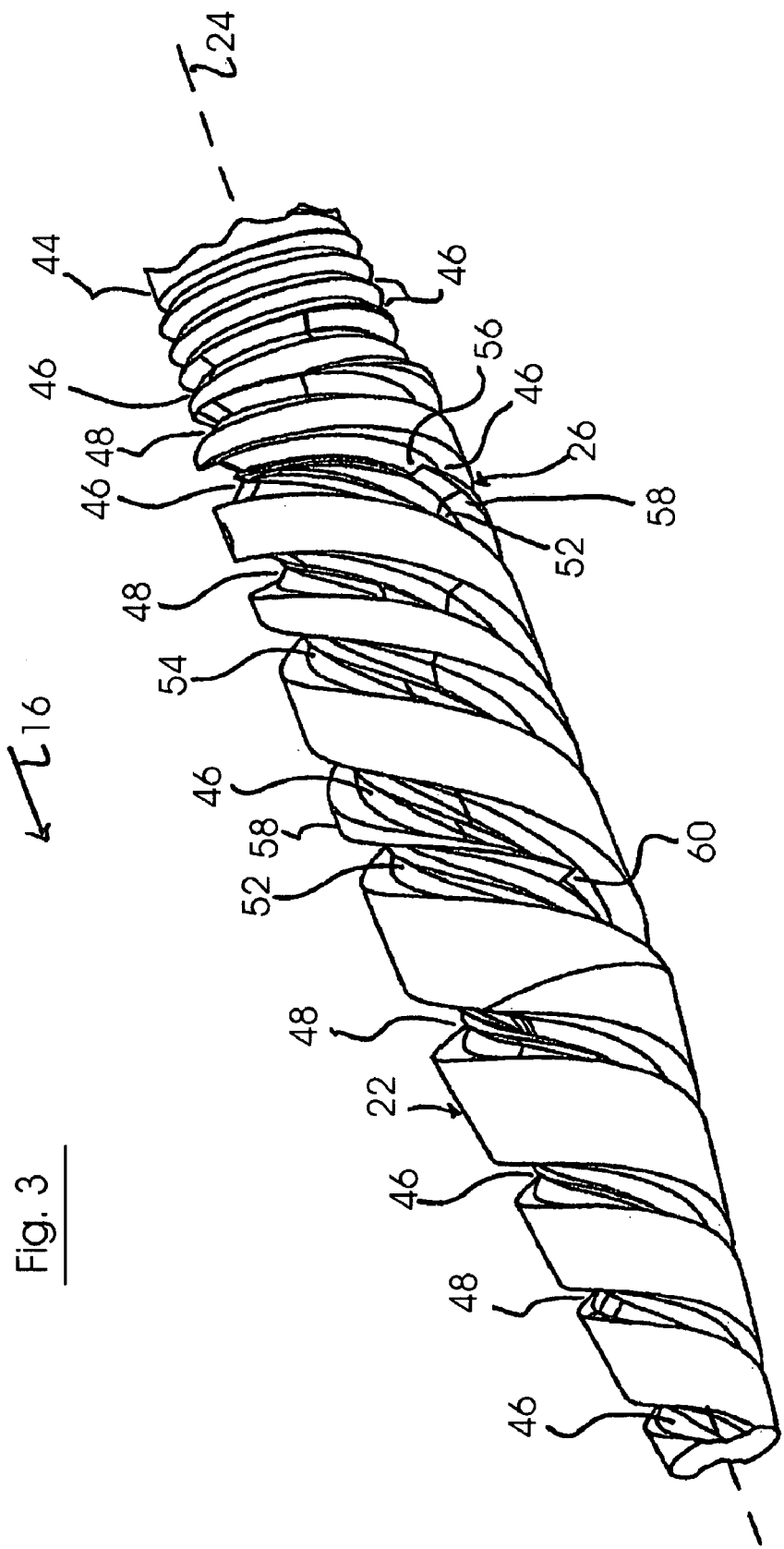
Figure 4:
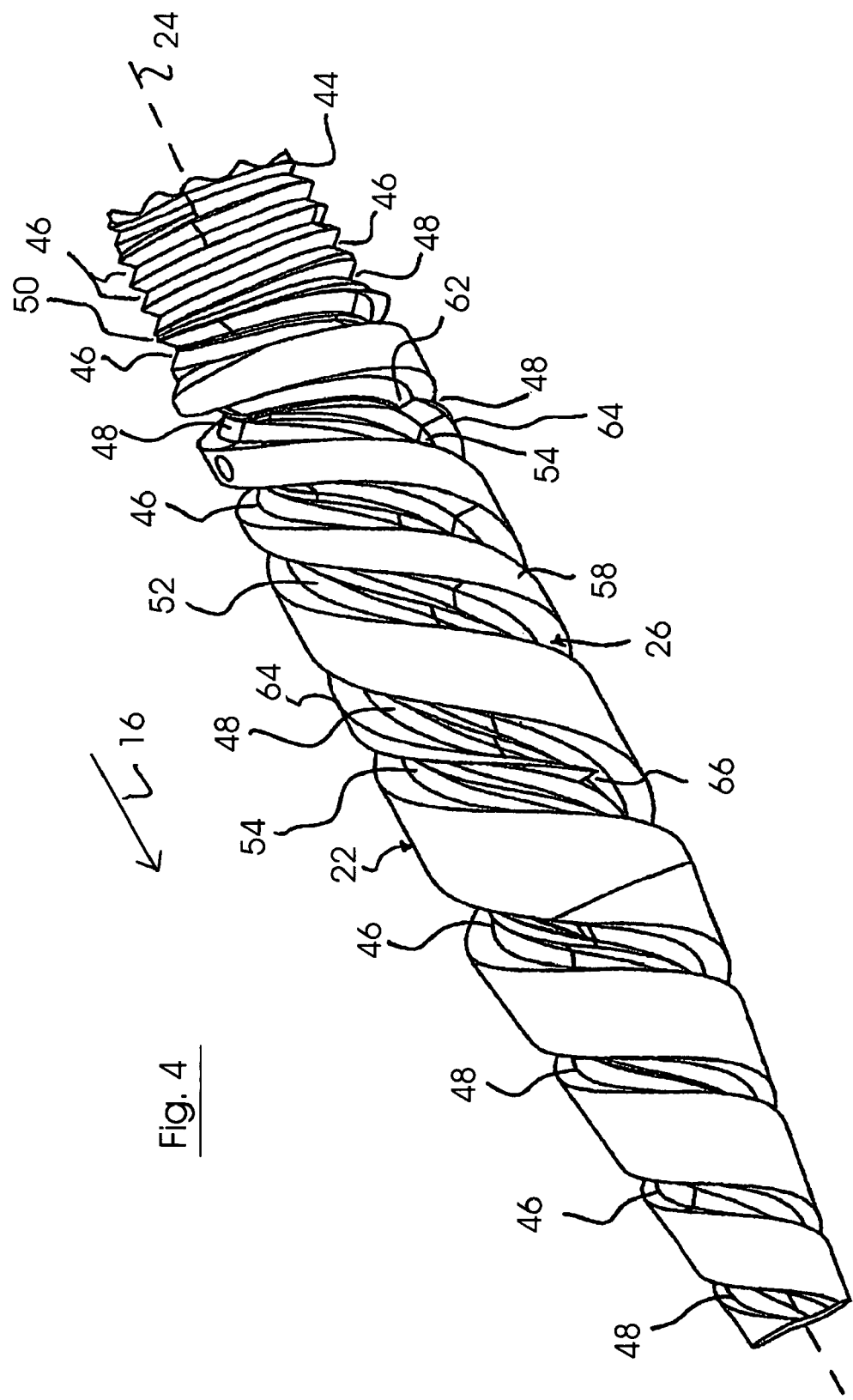
Figure 5:
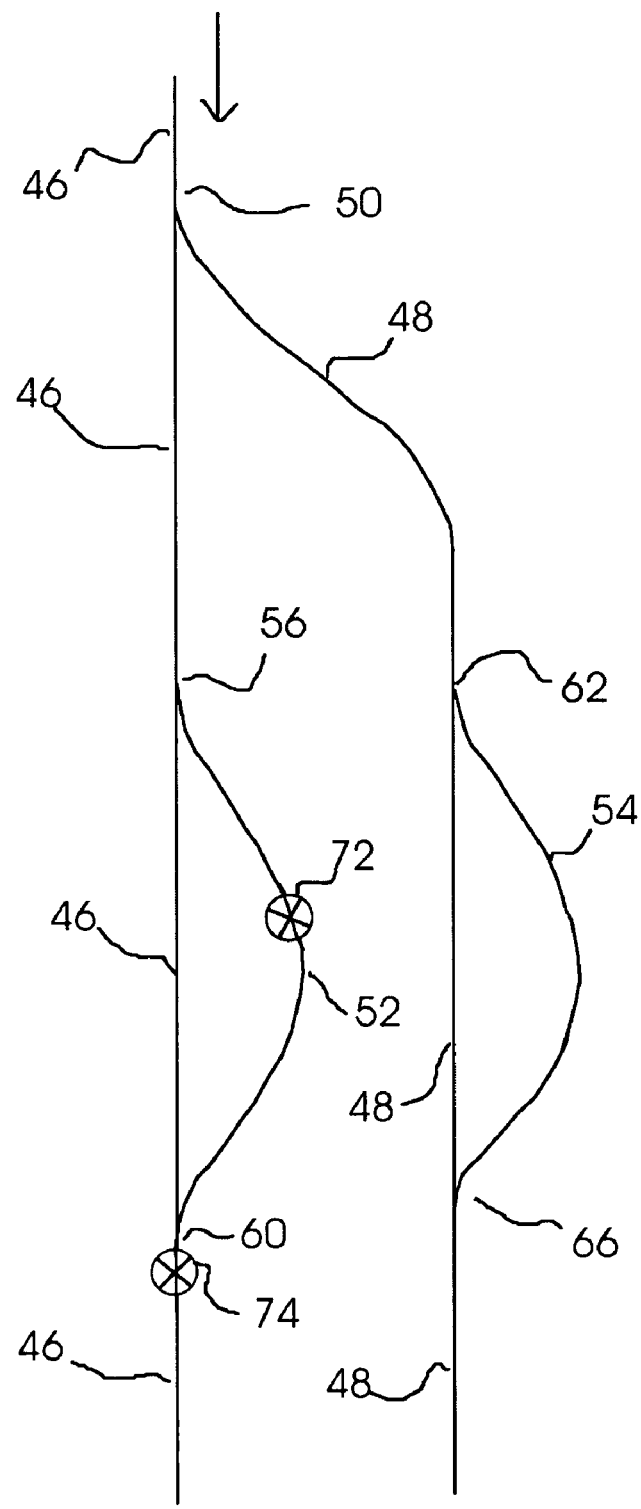

An exemplary embodiment of the invention is explained in more detail hereinbelow with reference to the attached drawings, in which:

FIG. 1 illustrates a highly schematic overall view of a screw conveyor according to the invention, FIG. 2 illustrates an enlarged perspective view of a shaft portion of the screw-shaft line of the screw conveyor from FIG. 1, FIG. 3 illustrates the shaft portion from FIG. 2 in a different rotary position, FIG. 4 illustrates the shaft portion from FIG. 2 in yet another rotary position, and FIG. 5 illustrates, schematically, a projected development of the conveying grooves which are made in the shaft portion from FIGS. 2 to 4.

The screw conveyor which is shown in FIG. 1, and is designated in general terms there by 10, serves for transporting hanging carriers 12, which are supplied, and transferred to the screw conveyor 10, in an introduction region 14 and, following transportation along a conveying direction 16, are discharged from the screw conveyor 10 in a discharging region 18. In the present example, the hanging carriers 12 are clothes hangers which each have a hanger hook 20 and have items of clothing (not illustrated specifically) hanging on them. It goes without saying that the screw conveyor 10 can also be used, in principle, for transporting any other desired hanging carriers instead of such clothes hangers. The screw conveyor is preferably used for receiving the clothes hangers 12 from an upstream transporting system, for example a pawl-type conveyor, in the introduction region 14 and for transferring them to a downstream transporting system, for example a suspension-type conveying arrangement with individual hanger carriers which can be displaced on rollers, in the discharging region 18. In order to transport the clothes hangers 12 in and out, it is, of course, also possible to use transporting systems other than those mentioned above, for example a suspension-type conveying arrangement with multiple hanger carriers which can be displaced on rollers, these often being referred to as trolleys and having a carrying bar on which a plurality of clothes hangers 12 can be suspended.

The screw conveyor has a screw-shaft line 22, which has its shaft axis 24 arranged parallel to the conveying direction 16 and is mounted such that it can be rotated about this axis 24. A conveying-groove system 26 is made in the circumferential casing of the screw-shaft line 22 and winds along and around the shaft axis 24, it being possible for the clothes hangers 12 supplied to the screw conveyor 10 to be suspended, by way of their top hanger hooks 20, in said conveying-groove system. The conveying-groove system 26 forms an arrangement of helices which serves for guiding the clothes hangers 12. If the screw-shaft line 22 is made to rotate about its shaft axis 24, then the clothes hangers 12 hanging thereon are advanced in the axial direction. The schematic drawing of FIG. 1 illustrates the conveying-groove system 26 as though it would form just a single helix which extends with constant pitch over the entire length of the screw-shaft line 22. This illustration, however, serves merely to simplify matters; it goes without saying that the conveying-groove system 26 may form, at least in certain sections, a plurality of adjacent helices and it may be possible to vary the pitch of each helix along the shaft axis 24. By varying the helix pitch and/or the number of helices, it is possible to achieve different effects. For example, the clothes hangers 12 may be separated by the turns of a helix being so close together that only a single clothes hanger can be accommodated in each turn. The helix pitch here is reduced such that it is approximately equal to or even somewhat less than the wire thickness of the hanger hooks 20. It is then possible for the turns to become gradually further apart from one another again, that is to say for the pitch of the helix to increase again gradually. An increase in the number of helices, for example doubling from one helix to two helices, makes it possible to double, for example, the number of clothes hangers 12 which can be transported. If such an additional helix is provided at critical locations along the screw-shaft line 22, it may be possible to prevent the screw conveyor 10 from "overloading".

A rotary-drive arrangement, which is designated in general terms by 28, serves for driving the screw-shaft line 22 in rotation. This rotary-drive arrangement 28 has at least one flexible drive belt 30, which is arranged preferably at an axial distance from the longitudinal ends of the screw-shaft line 22, wraps around the screw-shaft line 22, over part of its circumferential casing, such that it transmits driving power, for example by means of interengaging toothing formations, and is made to circulate in an endless loop by means of an electric drive motor 32. In the present example of FIG. 1, two such drive belts 30 are shown. The two drive belts 30 each drive, independently of one another, one of two coaxial segments 34, 36 of the screw-shaft line 22, the segments being separated from one another at a separating location 38, which is indicated by dashed lines, and being rotatable about the shaft axis 24 independently of one another. An electronic control unit 40 allows the drive motors 32 to be controlled independently of one another, in particular such that their speeds can be changed. Of course, it is also possible for the screw-shaft line 22 to be formed by a continuous, non-segmented screw shaft.

Each drive belt 30 has, on the outside of its loop, an arrangement of parallel channels 42 which extend over the entire width of the relevant drive belt 30 and run obliquely in relation to the direction in which the latter circulates. These channels 42 are designed, and oriented in relation to the conveying-groove system 26 of the screw-shaft line 22, such that it is possible for clothes hangers 12 which approach one of the drive belts 30 to run directly into one of the channels 42 from the conveying-groove system 26 and, after crossing the relevant drive belt 30, to be re-introduced into the conveying-groove system 26 of the screw-shaft line 22. This makes it possible for the clothes hangers 12, as they pass through the screw conveyor 10, to be moved axially beyond all the drive belts 30 in a reliable manner, and with guidance.

In the case of a preferred usage form of the screw conveyor 10, the clothes hangers 12 can be supplied to the screw conveyor 10 in disordered groups of several clothes hangers in each case, the screw conveyor 10 having the task of conveying the clothes hangers 12, separating them, disentangling them, synchronizing them and counting them, with the result that they leave the screw conveyor 10 individually one after the other. For this purpose, a first section of the screw-shaft line 22, which follows the introduction region 14, is expediently designed as an accumulating conveyor which, with the aid of a switchable stop (not illustrated specifically in FIG. 1), allows the clothes hangers which are supplied to the screw-shaft line 22 to accumulate.

This accumulating section may be followed by a separating section and a disentangling section which, merely by an appropriate configuration of the conveying-groove system 26, effect separation of the clothes hangers 12 and at least partial disentanglement of crossed-over clothes hangers 12. Such separating and disentangling sections are known per se in the case of screw conveyors. In the case of the clothes hangers 12 being supplied to the screw conveyor 10 in batches and then building up, however, the clothes hangers 12 may get caught up in one another such that only some of the crossovers of the clothes hangers 12 are eliminated in the disentangling section of the screw-shaft line 22, and some clothes hangers 12 are still crossed over downstream of the disentangling section. Since the following transporting processes would be disrupted to a considerable extent by the screw conveyor 10 discharging crossed-over clothes hangers 12, the screw-shaft line 22 is configured upstream of its discharging end, but downstream of its disentangling section, with a crossover-recognition section, in which any remaining crossovers of clothes hangers 12 can be detected.

The crossover-detection section mentioned is preferably formed on the segment 34 of the screw-shaft line 22. The previously mentioned separating and disentangling sections may likewise be formed on the segment 34. The other segment 36, in contrast, can serve, at least predominantly, for accumulating the clothes hangers supplied to the screw conveyor.

In order to explain the crossover-detection section of the screw-shaft line 22, reference is now made to FIGS. 2 to 4. These figures show a shaft portion 44 which, by way of its left-hand end in the figures, forms the discharging end of the screw-shaft line 22. On this shaft portion 44, the conveying-groove system 26 of the screw-shaft line 22 has two primary conveying grooves 46, 48 which are intertwined, that is to say wind around the shaft axis 24 one beside the other, and are referred to hereinbelow as main grooves. In order to show the course taken by the two main grooves 46, 48, the associated designations are indicated a number of times in FIGS. 2 to 4. As can be seen from FIG. 4 in particular, the main groove 48 starts between two successive turns of the main groove 46. The approximate location at which the main groove 48 starts is designated 50 in FIG. 4.

In the main groove 46, the clothes hangers 12 are conveyed onto the shaft portion 44. Even once they have passed through the above-mentioned separating and disentangling sections of the screw-shaft line 22, the situation where the clothes hangers 12, upon reaching the shaft portion 44, are still partly bunched up, instead of being conveyed completely separately from one another in a respective groove turn, cannot be ruled out. The additional main groove 48 here has the purpose of assigning each clothes hanger 12 supplied a dedicated groove turn, and thus of preventing overloading of the main groove 46. For this purpose, the cross section of the main groove 46 in the region upstream of the location 50 at which the main groove 48 originates is configured such that there is only space for a single clothes hanger 12 in each turn of the main groove 46. In addition, the turns of the main groove 46 in the region upstream of the location 50 at which the main groove 48 originates follow closely one after the other. As a result of this configuration of the main groove 46, any surplus clothes hangers 12 (surplus here means those clothes hangers 12 which exceed the conveying capacity of the main groove 46 and for which the main groove 46 thus cannot provide any turn in which to transport them) are forced outward, with the result that they are located approximately above the separating rib between two successive turns of the main groove 46. If these surplus clothes hangers 12 then pass into the region of the location 50 at which the main groove 48 originates, they inevitably drop into the main groove 48 and are transported further therein to the discharging end of the shaft portion 44.

Moreover, independently of the detection of crossed-over clothes hangers, we reserve the right to formulate independent protection for the ideas explained above of allowing a second main groove to start between two successive turns of a first main groove.

Downstream of the location 50 at which the main groove 48 originates, a secondary conveying groove 52, 54, referred to hereinbelow as bypass groove, branches off from each of the two main grooves 46, 48, respectively, and, following approximately one complete turn, runs into the associated main groove again. The branching-off location at which the bypass groove 52 branches off from the main groove 46 can be seen in FIG. 3, and is designated 56 there. Beginning at this branching-off location 56 is a rib 58 which separates the main groove 46 from the bypass groove 52, and which winds around the shaft axis 24 as far as an opening-out location 60, at which the bypass groove 52 runs into the main groove 46 again. That location at which the bypass groove 54 branches off from the main groove 48 can be seen in FIGS. 2 and 4, and is designated 62 there. Beginning at this branching-off location 62, in a corresponding manner, is a rib 64 which separates the main groove 48 from the bypass groove 54, and which winds around the shaft axis 24 as far as an opening-out location 66, at which the bypass groove 54 runs into the main groove 48 again.

It can clearly be seen in FIGS. 2 to 4 that the bypass grooves 52, 54 branch off forward, as seen in the conveying direction 16, from their associated main groove 46, 48, respectively, that is to say they precede the latter, as seen in the conveying direction 16. In this case, the main groove 46 and the bypass groove 52, in the region of the branching location 56 thereof, and the main groove 48 and the bypass groove 54, in the region of the branching location 62 thereof, are configured, in respect of their pitch and, if appropriate, also of their cross section, such that individually conveyed clothes hangers which are not crossed over other clothes hangers are transported further in the main groove 46 or 48 when they approach the associated branching location 56, 62, respectively. In order to explain this situation, FIG. 2 depicts, by way of example, an individual, crossover-free clothes hanger 12a, which is conveyed in the main groove 48. When this clothes hanger 12a approaches the branching location 62, it passes the branching location 62 without leaving the main groove 48. The same applies, of course, to a crossover-free clothes hanger which is conveyed in the main groove 46.

The situation is different in the case of crossed-over clothes hangers. A pair of such crossed-over clothes hangers is depicted by way of example in FIG. 2; they are designated 12b and 12c there. A crossover state results when one clothes hanger has its hanger hook 20 engaging in an upstream turn of the conveying-groove system 26—as seen in the conveying direction 16—but has its hanger crosspiece, on which the transported item or items of clothing hangs or hang, located behind the hanger crosspiece of another clothes hanger with its hanger hook engaging in a rear turn of the conveying-groove system 26. If such a pair of crossed-over clothes hangers approaches the branching location of the main groove 46 or 48, then the front clothes hanger, that is to say the clothes hanger with the leading clothes hook 20, as seen in the conveying direction 16, passes the branching location without leaving the relevant main groove. The reliability with which the front of two crossed-over clothes hangers remains in the main groove, on account of the tensile action which is directed counter to the conveying direction 16 and to which the hanger hook 20 of this clothes hanger is subjected as a result of the crossover, is even greater than in the case of individual, crossover-free clothes hangers. The hanger hook 20 of the trailing clothes hanger is likewise subjected to a tensile action, although the latter is directed in the conveying direction 16. This results in the trailing clothes hanger being forced, at the branching location, into the bypass groove which branches off from the respective main groove. This case is illustrated by the clothes hangers 12b, 12c depicted in FIG. 2. The hanger hook 20 of the trailing clothes hanger 12c has run into the bypass groove 52. The leading clothes hanger 12b in FIG. 2 is already located on the far side of the opening-out location 60 (see FIG. 3), at which the bypass groove 52 meets up with the main groove 46 again. In order to reach this location, however, it has not left the main groove 46.

The presence of a clothes hanger in one of the bypass grooves 52, 54 is thus an indication of the presence of crossed-over clothes hangers. An inductive sensor arrangement 68 serves for detecting such crossed-over clothes hangers. The sensor signals supplied by the sensor arrangement 68 are evaluated by an electronic evaluation unit 70 and—if the latter establishes the presence of crossed-over clothes hangers—are converted into a suitable reaction. This reaction may consist in the screw conveyor 10 being automatically switched off; as an alternative, or in addition, the evaluation unit 70 may actuate an optical and/or acoustic warning device (not illustrated specifically).

The sensor arrangement 68 has two sensors 72, 74, which are spaced apart axially from one another above the shaft portion 44. The position and distance between the sensors 72, 74 are selected such that, in a rotary position of the shaft portion 44 in which one of the bypass grooves 52, 54 runs past precisely beneath the rear sensor 72, as seen in the conveying direction 16—the main groove assigned to this bypass groove, at the same time, runs past precisely beneath the front sensor 74 by way of its next-following turn in front. This can clearly be seen in FIG. 2. In that rotary position of the shaft portion 44 which is shown there, the rear sensor 72 is located precisely above the bypass groove 52, while the front sensor 74 is located precisely above the main groove 46, to be precise at a location of the main groove 46 which is situated some way downstream of the opening-out location 60. If, in the case of such positioning of the sensors 72, 74, a pair of crossed-over clothes hangers passes through the shaft portion 44, they reach the two sensors 72, 74 simultaneously. The sensors 72, 74 thus simultaneously emit a sensor signal to the evaluation unit 70, which then establishes the presence of a crossover state. In the case of individual, crossover-free clothes hangers, in contrast, it is always just one of the sensors 72, 74 which emits a signal.

The relationships which have been explained above can easily be understood from the projected development of the main grooves 46, 48 and of the bypass grooves 52, 54 which is shown in FIG. 5.

What is claimed is:

1. A screw conveyor for transporting conveyable articles hanging on hanging carriers, in particular items of clothing hung on clothes hangers, comprising a screw-shaft line which can be rotated about its shaft axis and has a conveying-groove system which is made in the outer surface of the screw-shaft line, winds helically along and around the shaft axis, and in which the hanging carriers can be suspended, by way of carrying hooks, and can be conveyed axially by rotation of the screw-shaft line, wherein the conveying-groove system has at least one primary conveying groove, from which a secondary conveying groove, which precedes the primary conveying groove, as seen in the conveying direction of the conveyable articles along the shaft axis, branches off at a branching-off location, the configurations of the primary conveying groove and of the secondary conveying groove being coordinated, in particular in respect of the pitch profile thereof, such that crossover-free hanging carriers which approach the branching-off location in the primary conveying groove pass the branching-off location without leaving the primary conveying groove, and wherein, in order to detect crossed-over hanging carriers, the screw-shaft line is assigned a sensor arrangement which is designed for monitoring at least the secondary conveying groove for hanging carriers conveyed therein.

2. The screw conveyor as claimed in claim 1, wherein the sensor arrangement comprises a first sensor, for monitoring the secondary conveying groove, and a second sensor, which is arranged ahead of the first sensor as seen in the conveying direction, and is intended for monitoring the primary conveying groove for hanging carriers conveyed therein, and wherein an evaluation unit, which is connected to both sensors, emits a crossover-detection signal when the two sensors detect a hanging carrier in the respective conveying grooves in a predetermined time-specific relationship with respect to one another, in particular simultaneously.

3. The screw conveyor as claimed in claim 1, wherein the secondary conveying groove opens out into the primary conveying groove again at a distance from the branching-off location.

4. The screw conveyor as claimed in claim 3, wherein the secondary conveying groove extends approximately over a complete turn between its location at which it branches off from the primary conveying groove and its location at which it opens out into the primary conveying groove.

5. The screw conveyor as claimed in claim 1, wherein the conveying-groove system has a plurality of at least two primary conveying grooves which wind around the shaft axis one beside the other and from each of which a secondary conveying groove branches off, the sensor arrangement being designed for monitoring each of the secondary conveying grooves for hanging carriers conveyed therein.

6. The screw conveyor as claimed in claim 5, wherein upstream of the branching-off locations of the secondary conveying grooves, one of the primary conveying grooves starts between two successive turns of another primary conveying groove, in particular in a separating section of the screw-shaft line, in which the pitch of the other primary conveying groove is made to be approximately equal to or less than the material thickness of a carrying hook.

7. The screw conveyor as claimed in claim 1, wherein the sensor arrangement is configured as an inductive sensor arrangement.

* * * * *